United States Patent [19]

Zeiringer

[11] 4,142,871
[45] Mar. 6, 1979

[54] PREPARATION OF ABRASIVE MATERIAL FROM SPENT CATALYSTS

[75] Inventor: Hans Zeiringer, Kappel, Krappfeld, Austria

[73] Assignee: Treibacher Chemische Werke Aktiengesellschaft, Treibach, Austria

[21] Appl. No.: 845,387

[22] Filed: Oct. 25, 1977

[30] Foreign Application Priority Data

Oct. 25, 1976 [AT] Austria ............................ 7942/76

[51] Int. Cl.² .................... C04B 31/16; B24D 3/04
[52] U.S. Cl. ..................... 51/308; 51/309; 106/65
[58] Field of Search ............ 51/307, 308, 309, 295; 106/65, 69, 57, 58, 59

[56] References Cited

U.S. PATENT DOCUMENTS

| | | | |
|---|---|---|---|
| 3,615,308 | 10/1971 | Amero | 51/309 |
| 3,891,408 | 6/1975 | Rowse et al. | 51/309 |
| 3,918,219 | 11/1975 | Wentorf et al. | 51/307 |
| 4,035,162 | 7/1977 | Brothers et al. | 51/309 |
| 4,061,699 | 12/1977 | Cichy | 51/309 |

*Primary Examiner*—Donald J. Arnold
*Attorney, Agent, or Firm*—Kurt Kelman

[57] ABSTRACT

An abrasive material is prepared from a starting material comprised of a spent metallic catalyst on an alumina carrier by melting the starting material with a reducing agent to obtain a melt consisting of a melt component including the alumina on an alloy residue, cooling the melt at a speed correlated with a desired crystallite size of the abrasive material to be obtained, and mechanically separating the melt component from the alloy residue before or after solidification, the melt component constituting the abrasive material.

9 Claims, No Drawings

PREPARATION OF ABRASIVE MATERIAL FROM SPENT CATALYSTS

The present invention relates to a process for preparing an abrasive material from a starting material comprised of a spent metallic catalyst on an alumina carrier.

The last few decades have seen a steep rise in the use of heterogenous catalytic reactions. The ever increasing use of crude oil and its distillation products, which must be desulfured to protect the environment, has led to a considerable increase in the use of catalysts useful in such reactions. In one widely used catalytic desulfurization process, the hydracarbon starting materials are contacted with an MoCo catalyst on an alumina ($Al_2O_3$) carrier and the developing hydrogen sulfide is removed. In some instances, MoNi-and WNi-type catalysts or other metallic catalyst combinations are used.

During the catalytic reaction, the catalyst absorbs or adsorbs various chemical elements or compounds from the reactants and eventually becomes inactive. While the catalyst may be regenerated, it will eventually be spent and must be replaced. It is of considerable economic importance to utilize at least portions of such spent catalytic materials.

Various processes have been proposed for working up hydro-desulfurization catalytic materials of the indicated types. Austrian patent No. 329,284, for example, discloses a process for roasting the catalytic material with sodium chloride (NaCl) after calcining and then extracting vanadium, molybdenum, alumina, nickel and/or cobalt, the ammonium salts of molybdenum and vanadium as well as aluminum hydroxide ($Al(OH)_3$) being obtained after several process steps. Cobalt and nickel remaining in the extraction residue must be extracted in a further step if it is to be recovered.

Other processes work with soda (sodium carbonate) instead of sodium chloride. All the known processes are chemically complex and technically expensive, thus making them commercially unattractive. Furthermore, it is quite difficult to separate molybdenum from vanadium and cobalt from nickel.

It is the primary object of this invention to provide a process for preparing an abrasive material from spent catalytic materials of the indicated type, the alumina carrier component of the starting material providing the abrasive material and the metallic catalyst component providing valuable alloys which may be used directly or after refining in the steel and alloying industry, or which may be readily separated chemically into their chemical elements after having been stripped of the carrier.

I have made the unexpected discovery that high-quality abrasive materials may be obtained not only from clay or bauxite but also from spent catalytic material comprised of a metallic catalyst on an alumina carrier.

The process of the invention comprises the steps of melting the catalytic starting material with a reducing agent to obtain a melt consisting of a melt component including the alumina on an alloy residue, cooling the melt at a speed correlated with a desired crytallite size of the abrasive material to be obtained, and mechanically separating the melt component from the alloy residue before or after solidification. The melt component constitutes the abrasive material.

Preferably, the starting material is melted with at least one reducing agent, such as carbon, for instance coke, so that the melt component comprises at least a portion of the reducing agent. Aluminum may also be used as reducing agent. If the abrasive is to contain not only alumina but another component, an additive selected from the group consisting of zirconia ($ZrO_2$), titania ($TiO_2$), chromic oxide ($Cr_2O_3$), lime (CaO), magnesia (MgO), silica ($SiO_2$), zinc oxide (ZnO) and a rare earth oxide may be added to the alumina melt component. It is preferred to roast the catalytic starting material before it is melted.

The starting material may be melted in an electric arc furnace in the presence of the reducing agent or agents. If it contains much sulfur, it is advantageous to roast the material first to remove the sulfur. Depending on the desired properties of the abrasive material, any of the above listed additives may be added in any desired amounts, particularly useful additions including about 5% to 60%, by weight, of zirconia and/or up to 10%, by weight, of titania.

The size of the corundum crystallites obtained in the process may be influenced within wide limits by the rate of cooling of the melt, the crystallite size of the abrasive determining its usefulness for various fields of utilization. Considerable differences in the crystallite sizes and the corresponding utility of the abrasive can be obtained by solidifying the melt very slowly in a block, on the one hand, and rapidly cooling by casting it over steel balls, on the other hand. The resultant sizes of the corundum crystallites may accordingly vary, in dependence on the method of cooling, from 1 mm to 0.001 mm.

The solid alumina product component of the process of the present invention is an excellent abrasive after comminution and classification into various grain sizes, with or without heat treatment. Depending on the type and amount of additives as well as the crystallite size, these abrasives may be used for polishing steel, precision polishing under very light pressures or polishing wood.

The catalyst component accumulating as an alloy at the bottom of the melting furnace vessel is either cast or tapped with the alumina melt component, or it is permitted to solidify therewith in a block. Depending on the type of catalyst, the alloy is comprised primarily of MoCo, WNi, MoCoVNi and various impurities, such as sulfur, carbon, silicon, iron, titanium or chromium. After the alloy has been mechanically separated from the abrasive component, it may be used directly in the steel or alloying industry. If impurities, such as silicon, sulfur or carbon, are present in undesirable amounts, the alloy may be refined in any conventional manner. If the resultant alloys are not useful directly, they may readily be separated into their chemical elements.

The invention will be understood more fully from a description of certain specific examples, the alloys obtained in these examples being useful in the production of steel, including speciality steels:

EXAMPLE 1

Ten thousand kilogram of a roasted spent MoCo catalyst comprised, by weight, of 3.5% Co, 7.7% of Mo, 0.05% of S, 0.62% of Si and the remainder an $Al_2O_3$ carrier was mixed with 500 kg of coke, and the mixture was melted in a three-phase electric arc furnace. The melting vessel was a water-cooled, upwardly tapering sheet metal cylinder. After the vessel was filled with melt, electric current was cut off, and the melt was stored for 1 week during which it cooled slowly. After the solidified block was broken up, 1,206 kg of CoMo alloy was obtained. The remaining block of alumina weighed 8,239 kg and 443 kg of a poorly molten transition zone containing CoMo alloy was removed.

The alumina abrasive material and the alloy had the following composition, by weight, the analysis being based on the 8,239 kg block and the 1,206 kg of alloy:

|  | Abrasive | Alloy |  |
|---|---|---|---|
| 0.104 % | $Fe_2O_3$ | 26.9% | Co |
| 0.15 | CoO | 62.0 | Mo |
| 0.06 | $MoO_3$ | 0.036 | S |
| 0.04 | S | 5.43 | Fe |
| 0.05 | C | 2.15 | Si |
| 0.58 | $SiO_2$ | 3.15 | C |
| 0.05 | MgO |  |  |
| rest | $Al_2O_3$ |  |  |

The block containing primarily alumina was broken up and comminuted in a conventional manner to produce abrasive grains, the size of the corundum crystallites in the resultant abrasive varying between 0.1 and 1 mm. The coarse granular material obtained by the comminution was screened to obtain fractions 10 and 12 (according to the standard of the Federation Europeene des Frabricants de Produits Abrasifes, i.e. the FEPA standard). Fifty grams of each fraction were homogenously mixed and the apparent density of the mixture was determined. The 100 g of the mixture was placed into a steel ball mill containing five steel balls having a diameter of 35 mm. The mill was rotated until two thirds of the material passed through a No. 14 screen. The number of rotations of the ball mill required to comminute two thirds of this mixture sufficiently to pass it through a No. 14 screen is used as a measurement for the grain tenacity, the latter being decisive for the operating properties of the abrasive. The test results are given in Table I hereinbelow.

The separated alloy component was refined in a melting process with iron oxide in a conventional manner. $MoO_3$ or CoO may also be used in the refining process. After refining, the alloy had the following composition, by weight: 24.4% Co, 56.2% Mo, 18.43% Fe, 0.5% C, 0.2% Si, 0.03% S and 0.03% P.

EXAMPLE 2

Ten thousand kilogram of a roasted spent catalyst comprised, by weight, of 3.3% Co, 6.7% Mo, 11.3% V, 3.5% Ni, 0.08% S, 0.54% Si and the remainder an alumina carrier was mixed with 1670 kg of aluminum granules, and the mixture was melted and cooled in the same manner as in Example 1. The resultant alloy component weighed 2,615 kg and the abrasive component block weighed 8,975 kg of which 468 kg of a poorly molten transition zone was removed.

The respective components had the following composition, by weight:

|  | Abrasive | Alloy |  |
|---|---|---|---|
| 0.06 % | $Fe_2O_3$ | 12.0 % | Co |
| 0.07 | CoO | 12.9 | Ni |
| 0.05 | NiO | 25.0 | Mo |
| 0.06 | $MoO_3$ | 41.5 | V |
| 0.31 | $V_2O_5$ | 1.4 | C |
| 0.04 | S | 1.6 | Al |
| 0.04 | C | 2.8 | Fe |
| 0.05 | MgO | 1.2 | Si |
| 0.04 | Si |  |  |
| rest | $Al_2O_3$ |  |  |

The alumina component was comminuted was milled in the same manner as in Example 1 and the test results are given in Table I.

EXAMPLE 3

Five hundred kilogram of the roasted spent MoCo catalyst of the composition of Example 1 was mixed with 137 kg of buddeleyite and 25 kg of coke, and the mixture was melted in a three-phase electric arc furnace lined with carbon bricks. About two-thirds of the melt was cast over steel balls of a diameter of 30 mm to cool the melt rapidly. While the furnace was filled again with batches of the indicated composition for melting, the melt portion cast over the steel balls had cooled sufficiently to enable the broken up product to be subjected to a magnetic separation of the abrasive material component. The furnace was again emptied of two thirds of the melt, which was cast over steel balls, and the remainder with the alloy settled at the bottom of the furnace was poured into a receptacle.

The abrasive material component cooled over the steel balls had an average corundum crystallite size of 30 m$\mu$. The grain tenacity of this abrasive material was tested in the same manner as in Example 1 and the test results are given in Table I.

EXAMPLE 4

Example 1 was repeated but the mixture of catalyst and coke also contained 257 kg of rutile. The resultant abrasive material contained 2.7%, by weight, of titania and the size of the corundum crystallites averaged about 0.3 mm. The abrasive material was tested in the same manner and the test results are given in Table I.

Table I

| Abrasive Material Of | Grain Tenacity of the Abrasive Given in Number of Mill Rotations |
|---|---|
| Example 1 | 1850 |
| Example 2 | 1870 |
| Example 3 | 17500 |
| Example 4 | 2150 |

As the above test results indicate, the abrasive material obtained by the processes of Examples 1 and 2 are excellently adapted for use in precision polishing while the abrasives of Example 4, but particularly of Example 3, are useful for polishing steel under heavy abrading pressures.

What is claimed is:

1. A process for preparing an alumina abrasive material from a starting material comprised of a spent heavy metal alloy catalyst on an alumina carrier, comprising the steps of melting the starting material with at least one reducing agent to obtain a melt consisting of a melt component including the alumina on a residue of the alloy, cooling the melt at a speed correlated with a desired crystallite size of the abrasive material to be obtained, and mechanically separating the alumina-containing melt component from the alloy residue, the melt component constituting the abrasive material.

2. The process of claim 1, wherein the starting material is melted with at least one reducing agent consisting of carbon.

3. The process of claim 1, wherein the carbon reducing agent is coke.

4. The process of claim 1, wherein the melt component comprises at least a portion of the reducing agent.

5. The process of claim 1, wherein at least one additive selected from the group consisting of zirconia, titania, chromic oxide, lime, magnesia, silica, zinc oxide and a rare earth oxide is added to the melt component.

6. The process of claim 5, wherein about 5% to 60%, by weight, or zirconia is added to the melt component.

7. The process of claim 5, wherein up to 10%, by weight, of titania is added to the melt component.

8. The process of claim 1, wherein the melt component is separated from the alloy residue before solidification.

9. The process of claim 1, wherein the melt component is separated from the alloy residue after solification.

* * * * *